United States Patent
Yamaguchi

(10) Patent No.: US 10,116,811 B2
(45) Date of Patent: Oct. 30, 2018

(54) IMAGE FORMING SYSTEM, IMAGE FORMING APPARATUS, AND IMAGE FORMATION CONTROL PROGRAM

(71) Applicant: KONICA MINOLTA, INC., Chiyoda-ku, Tokyo (JP)

(72) Inventor: Hiroshi Yamaguchi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/980,221

(22) Filed: Dec. 28, 2015

(65) Prior Publication Data

US 2016/0191720 A1 Jun. 30, 2016

(30) Foreign Application Priority Data

Dec. 25, 2014 (JP) .................................. 2014-262471

(51) Int. Cl.
G06K 15/02 (2006.01)
H04N 1/00 (2006.01)
B01J 13/00 (2006.01)
G06K 15/00 (2006.01)

(52) U.S. Cl.
CPC ............ *H04N 1/0032* (2013.01); *B01J 13/00* (2013.01); *G06K 15/022* (2013.01); *G06K 15/403* (2013.01); *H04N 1/00748* (2013.01)

(58) Field of Classification Search
None
See application file for complete search history.

(56) References Cited

U.S. PATENT DOCUMENTS

| 2003/0090727 | A1* | 5/2003 | Piatt | B41J 2/21 358/3.01 |
| 2005/0105112 | A1* | 5/2005 | Fukuda | H04N 1/6033 358/1.9 |
| 2005/0275712 | A1* | 12/2005 | Konagaya | G03B 27/587 347/237 |

(Continued)

FOREIGN PATENT DOCUMENTS

| JP | 06246987 A | 9/1994 |
| JP | 2005194018 A | 7/2005 |

(Continued)

OTHER PUBLICATIONS

Japanese Office Action (and English translation thereof) dated Feb. 14, 2017 issued in counterpart Japanese Application No. 2014-262471.

(Continued)

Primary Examiner — Ted Barnes
(74) Attorney, Agent, or Firm — Holtz, Holtz & Volek PC

(57) ABSTRACT

A control apparatus controls a sheet feeding apparatus, an image forming apparatus and a sheet delivering apparatus so as to perform image formation based on image data while conveying a long sheet at a constant speed, and at the time of executing image formation of another image based on another image data other than the image data in the middle of image formation based on the image data, the control apparatus controls to stop conveying of the long sheet temporarily, and controls to cut out a region where the another image is formed in the state of stopping conveying of the long sheet temporarily.

19 Claims, 12 Drawing Sheets

(56) References Cited

U.S. PATENT DOCUMENTS

| | | | |
|---|---|---|---|
| 2007/0022892 A1* | 2/2007 | Currans | B41F 33/00 101/483 |
| 2008/0024541 A1* | 1/2008 | Hirato | B41J 2/155 347/19 |
| 2008/0218777 A1* | 9/2008 | Matsuzawa | H04N 1/6033 358/1.9 |
| 2008/0231874 A1* | 9/2008 | Matsuzawa | H04N 1/6033 358/1.9 |
| 2009/0217835 A1* | 9/2009 | Rozenblum | B41J 11/008 101/484 |
| 2009/0290180 A1* | 11/2009 | Onoda | H04N 1/46 358/1.9 |
| 2010/0018425 A1* | 1/2010 | Schaedlich | B41F 33/12 101/483 |
| 2010/0020123 A1* | 1/2010 | Hirato | B41J 29/393 347/19 |
| 2010/0110138 A1* | 5/2010 | Mikuriya | B41J 29/02 347/19 |
| 2011/0134445 A1* | 6/2011 | Matsuzawa | H04N 1/6033 358/1.5 |
| 2013/0057611 A1* | 3/2013 | Wu | B41J 2/2139 347/19 |
| 2015/0068377 A1* | 3/2015 | Chanclon | B41J 11/663 83/37 |

FOREIGN PATENT DOCUMENTS

| | | |
|---|---|---|
| JP | 2006084796 A | 3/2006 |
| JP | 2012080346 A | 4/2012 |
| JP | 2013082093 A | 5/2013 |

OTHER PUBLICATIONS

Japanese Office Action (and English translation thereof) dated Aug. 29, 2017 issued in counterpart Japanese Application No. 2014-262471.

Japanese Office Action (and English translation thereof) dated May 2, 2017, issued in counterpart Japanese Application No. 2014-262471.

* cited by examiner

IMAGE FORMING SYSTEM, IMAGE FORMING APPARATUS, AND IMAGE FORMATION CONTROL PROGRAM

The present application claims the priority right under the Paris Convention based on Japanese Patent Application No. 2014-262471 filed on Dec. 25, 2014, in accordance with the provisions in the United States patent Law.

BACKGROUND OF THE INVENTION

Field of the Invention

The present invention relates to an image forming system, an image forming apparatus, and an image formation control program. In particular, the present invention relates to a technique at the time of executing image formation of another image in the middle of executing image formation by using long sheets, such as a continuous sheet and a rolled sheet.

Description of Related Art

In image forming apparatuses, such as a printer which performs image formation based on image data, it is common to form images onto a sheet called a cut sheet which is cut out into a predetermined fixed sheet size, such as a letter size.

On the other hand, in such an image forming apparatus, it is also possible to form images onto a long sheet called a continuous sheet or a rolled sheet with a sheet length longer in a conveying direction than a sheet with a fixed size. Such a long sheet is used for use purposes, for example, printing repeatedly a label with a seal format, such as an address, a serial number, and a commodity indication.

In such an image forming apparatus, in order to maintain the density, color, position, etc. of an image to be formed to a proper state, correction is executed for the density, color, position, etc. of an image to be formed for every predetermined period. In this case, an image for adjustment (adjustment chart) is formed by using adjustment image data other than ordinary image data, and then this adjustment chart is read by a sensor. Subsequently, based on the read result of the adjustment chart, correction is executed for the density, color, and position of an image to be formed.

Herein, there exists also a technique of not transferring an adjustment chart onto a sheet by reading it by a sensor in the state that an image of the adjustment chart is formed on a photoreceptor. However, by reading an adjustment chart transferred onto a sheet actually, it becomes possible to perform measurement much more correctly.

In the case where an adjustment chart is transferred onto a cut sheet of a fixed sheet size, only a sheet onto which image formation of an adjustment image is executed during image formation of ordinary images, is removed from ordinary sheets. Thereby, any problem does not occur in output resultant matters (a group of sheets subjected to image formation of ordinary images).

However, in the case of an image forming apparatus which executes sheet feeding, image formation, and sheet delivering (winding up a long sheet without any change) by using a long sheet, situations become different. That is, a problem arises in that an adjustment chart mixes into output resultant matters made by using the long sheet. However, if adjustment for an image density and an image position by using an adjustment image is not executed for each time after a predetermined amount of image formation has been executed, there may be a possibility that a desired image quality cannot be maintained.

SUMMARY OF THE INVENTION

Japanese Unexamined Patent Publication No. 2006-84796 (Patent Document 1) proposes a technique of outputting an adjustment image in an image forming apparatus which uses a long sheet. That is, as the first step, it is proposed that an adjustment chart is printed on a margin region in the main scanning direction on a long sheet and the adjustment chart is measured. Further, as the second step, it is proposed that based on the measurement result of the adjustment chart, an image interval is widened, a gap in the sub scanning direction (the conveyance direction) is widened, and an adjustment chart is printed in the vicinity of a central portion in the main scanning direction.

According to Patent Document 1, it is not proposed that the adjustment chart is cut out and removed. Accordingly, it may be thought that a long sheet including the adjustment chart is wound up on a sheet delivery side.

In such a case, when the long sheet is processed (clipped) into labels at a post process, there is a fear that the image of the adjustment chart other than an ordinary job is also made into labels. That is, the matter itself that the adjustment chart is wound up on the sheet delivery side is a problem.

Namely, in an image forming apparatus which performs sheet feeding, image formation, and sheet delivering (winding up a long sheet without change) by using a long sheet, in the case where an adjustment chart is formed in the middle of image formation of ordinary images, there has not exist a technique of avoiding a problem that an adjustment chart mixes into output resultant matters.

The above description relates to problems in the adjustment chart. However, also in the case where image formation of another image is interrupted during image formation of ordinary images, the exact same problems are expected to occur. Herein, as another image, a small number of images for interruption output and an image for sample output for the next job correspond to it.

An object of the present invention is to provide an image forming system, an image forming apparatus, and an image formation control program, wherein at the time of executing sheet feeding, image formation, and sheet delivering (winding up) by using a roll-shaped long sheet, even if image formation of another image is executed in the middle of image formation of ordinary images, it becomes possible to make another image not to be wound up on a sheet delivery side.

(1) An image forming system to which one aspect of the present invention is reflected, includes:

a sheet feeding apparatus which feeds a long sheet with a sheet length in a conveying direction longer than a sheet of a fixed sheet size;

an image forming apparatus which performs image formation based on image data while conveying the long sheet being fed from the sheet feeding apparatus;

a sheet delivering apparatus which winds up the long sheet subjected to the image formation; and a control apparatus which controls the sheet feeding apparatus, the image forming apparatus, and the sheet delivering apparatus;

wherein the control apparatus controls the sheet feeding apparatus, the image forming apparatus, and the sheet delivering apparatus so as to perform image formation based on the image data while conveying the long sheet at a constant speed, and wherein at the time of executing image formation of another image based on another image data other than the image data in the middle of image formation based on the image data, the control apparatus controls to stop conveying of the long sheet temporarily, and controls to cut out a region where the another image is formed, in the state of stopping conveying of the long sheet temporarily.

Further, an image forming apparatus to which one aspect of the present invention is reflected, and which is able to constitute an image forming system by being set to a sheet feeding apparatus and a sheet delivering apparatus, includes:

a control section which controls to feed a long sheet with a sheet length in a conveying direction longer than a sheet of a fixed sheet size from the sheet feeding apparatus, to perform image formation based on image data while conveying the long sheet, and to output the long sheet subjected to image formation to the sheet delivering apparatus;

wherein the control apparatus controls the sheet feeding apparatus, the image forming apparatus, and the sheet delivering apparatus so as to perform image formation based on the image data while conveying the long sheet at a constant speed, and wherein at the time of executing image formation of another image based on another image data other than the image data in the middle of image formation based on the image data, the control apparatus controls to stop conveying of the long sheet temporarily, and controls to cut out a region where the another image is formed, in the state of stopping conveying of the long sheet temporarily.

Further, an image formation control program to which one aspect of the present invention is reflected, and which is recorded in a readable recording medium and controls an image forming system including a sheet feeding apparatus, an image forming apparatus, and a sheet delivering apparatus, is configured to make a computer of an image forming system so as to function, the image forming system includes:

a sheet feeding apparatus which feeds a long sheet with a sheet length in a conveying direction longer than a sheet of a fixed sheet size;

an image forming apparatus which performs image formation based on image data while conveying at a constant speed the long sheet being fed from the sheet feeding apparatus;

a sheet delivering apparatus which winds up the long sheet subjected to the image formation; and a control apparatus which controls the sheet feeding apparatus, the image forming apparatus, and the sheet delivering apparatus at an ordinary time so as to perform image formation based on the image data while conveying the long sheet at a constant speed, wherein in the case where the image forming apparatus has executed image formation of another image based on another image data, the control apparatus controls to stop winding up of the long sheet in the sheet delivering apparatus before the region where the another image is formed on the long sheet is wound up into the sheet delivering apparatus, and wherein in the state that the region where the another image is formed on the long sheet has gone out from the image forming apparatus, the control apparatus controls to stop conveying of the long sheet temporarily, and in the state that conveying of the long sheet is stopped temporarily, the control apparatus controls to cut out the region where the another image is formed.

(2) In the above (1), in the case where image formation of another image has been executed by using the another image data, the control apparatus controls to stop winding up of the long sheet in the sheet delivering apparatus before the region where the another image is formed on the long sheet is wound up into the sheet delivering apparatus.

(3) In the above (1), in the case where image formation of another image has been executed by using the another image data, the control apparatus controls to stop winding up of the long sheet in the sheet delivering apparatus before a region where the another image is formed on the long sheet is wound up into the sheet delivering apparatus, and the control apparatus controls conveying of the long sheet such that the region where the another image is formed on the long sheet goes out from the image forming apparatus.

(4) In the above (3), in the state that the region where another image is formed on the long sheet has gone out from the image forming apparatus, the control apparatus controls to stop conveying of the long sheet temporarily.

(5) In the above (1) to (4), there is provided a display section to execute various kinds of indication based on control of the control apparatus, and the control apparatus displays at least one of an indication to urge to remove the region where the another image is formed and an indication to confirm whether the region where the another image is formed is removed or not, on the display section.

(6) In the above (1) to (5), there is provided a cutting section to cut out a long sheet, and the control section controls the cutting section to cut out an end on a leading end side of the region where the another image is formed on the long sheet in the state that conveying of the long sheet is stopped temporarily, and to cut out an end on a trailing end side of the region where the another image is formed on the long sheet in the state that conveying of the long sheet is stopped temporarily.

(7) In the above (1) to (6), in the case where image formation of another image has been executed by using another image data, the control section controls to restart temporarily conveying of the long sheet stopped temporarily so as to make the long sheet into a state of going out from the image forming apparatus by a length necessary for setting the leading end of a succeeding long sheet from which the region where the another image is formed has been removed, onto the sheet delivering apparatus, and when the long sheet becomes the above state, the control section controls to stop again conveying of the long sheet temporarily, and to set the long sheet in the state that conveying of the long sheet is stopped temporarily.

(8) In the above (1) to (7), there is provided a display section to execute various kinds of indication based on control of the control apparatus, and the control apparatus displays at least one of an indication to urge to set the long sheet from which the region of the another image has been removed and an indication to confirm whether the long sheet from which the region of the another image has been removed is set or not, on the display section.

(9) In the above (1) to (8), there is provided a connecting section to set the leading end of a cut-out long sheet onto the sheet delivering apparatus, and the control section controls the connecting section so as to set the leading end of the long sheet from which the region of the another image has been removed, onto the sheet delivering apparatus.

(10) In the above (1) to (8), in the case where the leading end of the succeeding long sheet from which the region where the another image is formed has been removed is set onto the sheet delivering apparatus, the control section controls to restart sheet feeding by the sheet feeding apparatus, image formation by the image forming apparatus, and winding up by the sheet delivering apparatus.

DETAILED DESCRIPTION OF THE PREFERRED EMBODIMENT

Hereinafter, with reference to drawings, description is given to an embodiment of an image forming apparatus, an image forming system, and an image formation control program. Further, herein, description is given to a specific example where, at the time of executing sheet feed, image formation, and sheet delivery (rolling up) by using a roll-shaped long sheet, if image formation of another image is executed in the middle of image formation of an ordinary image, another image is made not to be wound up to a sheet delivery side.

Herein, operation in an image forming apparatus 100 and an image forming system is an image formation control method. Further, control of a control section 101 which controls operation in the image forming apparatus 100 and the image forming system is executed based on an image formation control program.

[Constitution of an Image Forming System]

Figure 1:
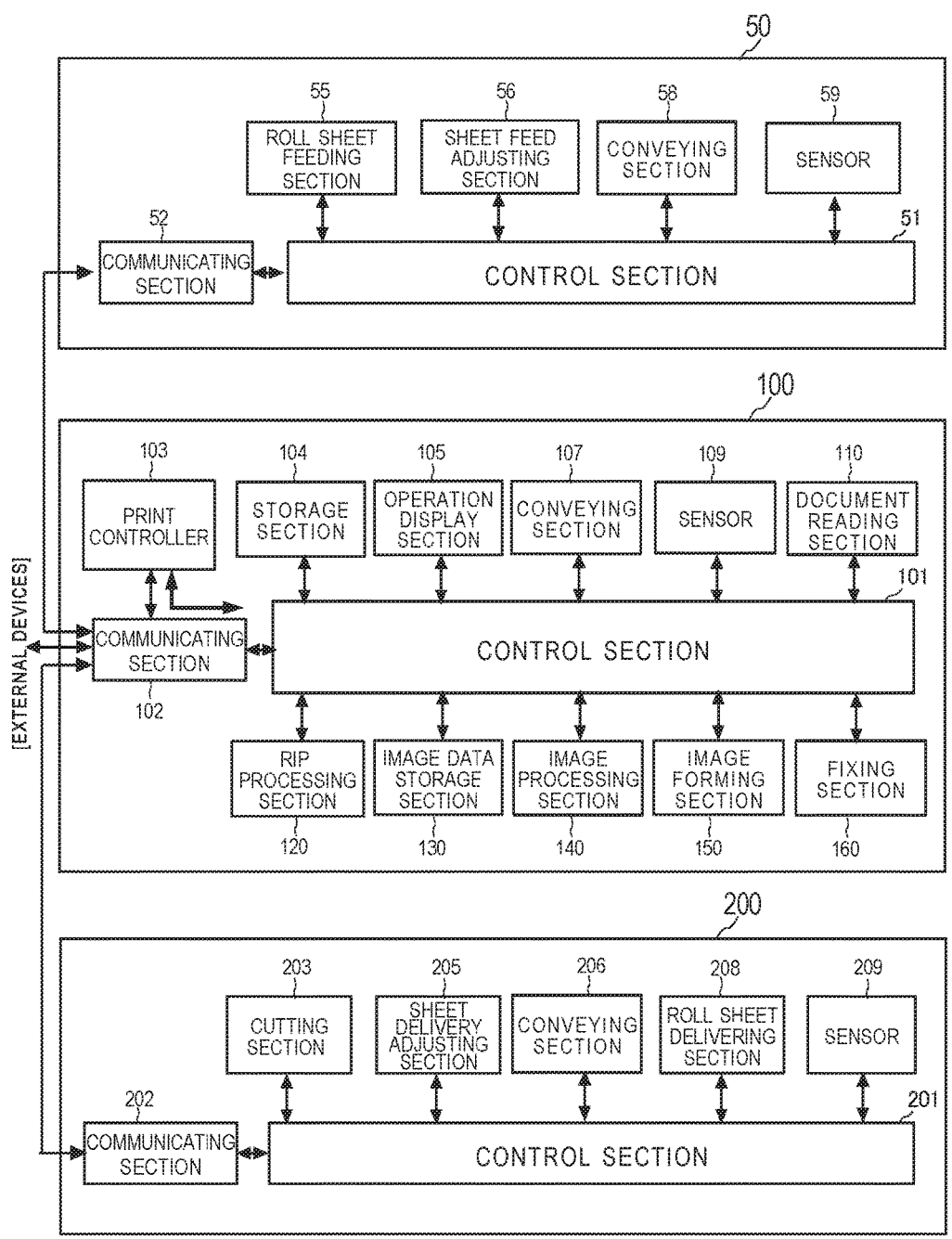
FIG. 1 is a constitutional diagram showing a constitution of an image forming system of an embodiment of the present invention.
Figure 2:
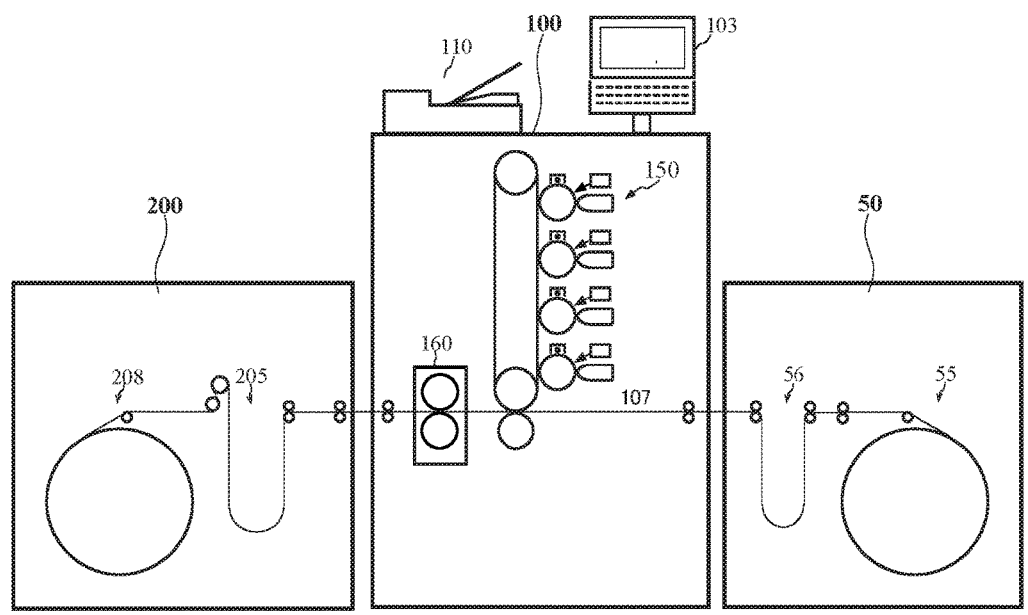
FIG. 2 is a constitutional diagram showing a constitution of an image forming system of an embodiment of the present invention.
Figure 3:
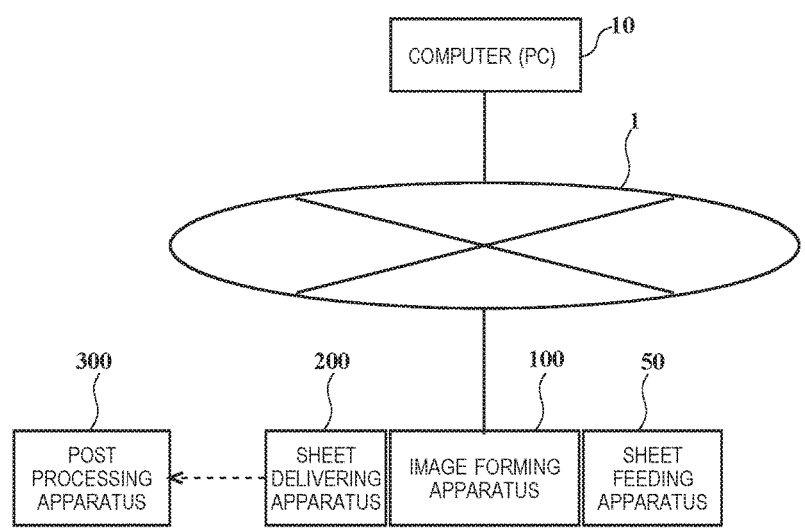
FIG. 3 is a constitutional diagram showing a constitution of an image forming system of an embodiment of the present invention.

Herein, based on FIG. 1, FIG. 2, and FIG. 3, description is given in detail to a constitutional example of the image forming system in which a sheet feeding apparatus 50, the image forming apparatus 100, and a sheet delivering apparatus 200 are set up.

The image forming system in which the sheet feeding apparatus 50, the image forming apparatus 100, and the sheet delivering apparatus 200 are set up, is configured to be able to exchange information via a network 1 with a computer (PC) 10 to produce job data (refer to FIG. 3).

Further, a post processing apparatus 300 which applies post processing, such as cutting processing, to a long sheet is disposed in an arrangement of online connection, near line, or offline relative to the image forming system of the present embodiment to execute image formation to a long sheet (refer to FIG. 3).

The sheet feeding apparatus 50 is constituted to include a control section 51, a communicating section 52, a roll sheet feeding section 55, a sheet feed adjusting section 56, a conveying section 58, and a sensor 59. The control section 51 controls each section in the sheet feeding apparatus 50 based on instructions of a control section 101 mentioned later. The communicating section 52 communicates with other apparatuses being set up, such as the image forming apparatus 100.

The roll sheet feeding section 55 feeds a long sheet from a sheet roll to the image forming apparatus 100. The sheet feed adjusting section 56 absorbs fluctuation of a conveying speed while adjusting a tension state and slack state of a sheet fed from the roll sheet feeding section 55. The conveying section 58 conveys a sheet within the sheet feeding apparatus 50. The sensor 59 detects various kinds of states with regard to sheet conveyance.

The image forming apparatus 100 is constituted to include a control section 101, a communicating section 102, a print controller 103, a storage section 104, an operation display section 105, an image formation conveying section 107, a sensor 109, a document reading section 110, an RIP processing section 120, a data storage section 130, an image processing section 140, an image forming section 150, and a fixing section 160.

The control section 101 controls each section in the image forming apparatus 100. This control section 101 may exist as a control apparatus on the outside of the image forming apparatus 100. The communicating section 102 communicates with other apparatuses (external devices, the sheet feeding apparatus 50, and the sheet delivering apparatus 200) being set up. The print controller 103 receives job data described with page description languages from the external devices, and memorizes them if needed. The storage section 104 memorizes various kinds of settings.

The operation display section 105 performs reception of an operational input by a user and display of a state of the image forming apparatus 100. The image formation conveying section 107 conveys a sheet within the apparatus. The sensor 109 detects various kinds of states with regard to image formation and sheet conveyance. The document reading section 110 reads images of a document with an image sensor, and produces document image data.

The RIP processing section 120 executes RIP processing for job data which are received by the print controller, described with page description languages, and not subjected to the RIP processing, and converts the job data into image data in a bit map format capable of being used for image formation. The data storage section 130 memorizes image data and various kinds of data at the time of performing image formation.

The data storage section 130 is constituted to include a reading-use image memory to receive image data, and a print-use image memory to output the received image data for image formation. The image processing section 140 executes various kinds of image processing necessary for image formation.

The image forming section 150 forms an image on a sheet based on an image formation order and image data stored in the print-use image memory in the data storage section 130. The fixing section 160 stabilizes a toner image formed on a sheet with heat and pressure.

The sheet delivering apparatus 200 is constituted to include a control section 201, a communicating section 202, a cutting section 203, a sheet delivery adjusting section 205, a conveying section 206, a roll sheet delivering section 208, and a sensor 209.

The control section 201 controls each section in the sheet delivering apparatus 200 based on control of the control section 101. The communicating section 202 communicates with other apparatuses being set up, such as the image forming apparatus 100. The cutting section 203 cuts out a long sheet at a prescribed position. The sheet delivery adjusting section 205 absorbs fluctuation of a conveying speed while adjusting a tension state of a sheet delivered from the image forming apparatus 100. The conveying section 206 conveys a sheet within the sheet delivering apparatus 200. The roll sheet delivering section 208 delivers a long sheet from the image forming apparatus 100 as a sheet roll while winding up it in a roll form. The sensor 209 detects various kinds of states with regard to sheet conveyance.

In FIG. 3, although the cutting section 203 is not shown, various kinds of constitution to cut out a long sheet can be adopted. As long as the cutting section 203 is located after the fixing section 160 of the image forming apparatus 100 and before the roll sheet delivering section 208, the cutting section 203 may be arranged at any position. For example, the cutting section 203 may be located in the inside of the image forming apparatus 100 and after the fixing section 160, alternatively, the cutting section 203 may be an independent apparatus located at a middle point between the image forming apparatus 100 and the sheet delivering apparatus 200.

Although not shown in FIG. 1 and FIG. 3, there may exist a connecting section to set a leading end of a succeeding long sheet from which a region of another image has been cut out, onto the sheet delivering apparatus 200. Further, although not shown in FIG. 1 and FIG. 3, alternatively, there may exist a connecting section to connect a leading end of a succeeding long sheet from which a region of another image has been cut out, to a sheet remaining in the sheet delivering apparatus 200.

Further, in FIG. 1 and FIG. 2, as an image forming system by the sheet feeding apparatus 50, the image forming apparatus 100, and the sheet delivering apparatus 200, a case configured to handle a long sheet is shown as a specific example. Herein, a long sheet means a sheet having a sheet length in a conveying direction longer than a sheet of a fixed sheet size.

Furthermore, in FIG. 2, an image forming apparatus configured to perform image formation with multiple colors is shown as the image forming section 150. However, the present invention is not limited to this example, and the image forming section 150 may perform image formation of monochrome.

Various kinds of constitution can be considered with regard to sheet feed, an image formation, and sheet delivery. However, FIGS. 1 to 3 merely show one example. Accordingly, the present invention should not be limited to the constitution and embodiment shown in the specific example.

Image data of a job being currently executed are called "image data of ordinary" or "ordinary image data"; image formation based on ordinary image data is called "image formation of ordinary" or "ordinary image formation; and an image formed by ordinary image formation is called "image of ordinary" or "ordinary image".

On the other hand, in the middle of ordinary image formation which forms an ordinary image based on ordinary image data, image data used for the purpose of adjustment, sample output, or interruption image formation are called "another image data"; image formation based on "another image data" is called "another image formation"; and an image formed based on "another image data" is called "another image".

The adjustment is an operation to maintain an image formation density and an image formation position properly by outputting an adjustment chart for each predetermined period and measuring the adjustment chart. Further, the sample output is an operation executed so as to output the small number of print sets as a sample for a job expected to be executed the next. The interruption image formation is an operation executed so as to output the small number of print sets of an urgent job preferentially.

In this embodiment, a case where adjustment, sample output, or interruption image formation, etc. enters in the middle of image formation of an ordinary image is expressed as "interruption". Herein, control of the control section 101 in the present embodiment is made as follows roughly.

As mentioned later, the control section 101 controls the sheet feeding apparatus 50, the image forming apparatus 100, and the sheet delivering apparatus 200 so as to perform image formation based on image data while conveying a long sheet at a constant speed.

That is, at the time of executing image formation of another image by using another image data other than ordinary image data in the middle of image formation based on ordinary image data, the control section 101 controls to stop conveying of a long sheet temporarily. Then, in the state that the conveying of a long sheet is stopped temporarily, the control section 101 controls to cut out a region where another image is formed.

In the case where image formation of another image has been executed by using another image data, the control section 101 controls to stop winding up of the long sheet in the sheet delivering apparatus 200 before the region where the another image is formed on the long sheet is wound up in the sheet delivering apparatus 200.

In the case where image formation of another image has been executed by using another image data, the control section 101 controls to stop winding up of the long sheet in the sheet delivering apparatus 200 before the region where the another image is formed on the long sheet is wound up in the sheet delivering apparatus 200, and controls conveying of the long sheet to make the region where the another image is formed on the long sheet go out from the image forming apparatus 100.

In the state that the region where the another image is formed on the long sheet has gone out from the image forming apparatus 100, the control section 101 controls conveying of the long sheet to stop the conveying of the long sheet temporarily. The control section 101 performs at least one of an indication to urge so as to remove the region where the another image is formed and an indication to confirm whether the region where the another image is formed is removed or not, on any one of the operation display section 105, a display section of another apparatus, and another display apparatus.

In the case where there is provided the cutting section 203, the control section 101 controls the cutting section 203 so as to cut out an end of the leading end of the region where the another image is formed on the long sheet in the state that conveying of the long sheet is stopped temporarily, and successively, so as to cut out an end of the trailing end of the region where the another image is formed on the long sheet in the state that conveying of the long sheet is stopped temporarily.

In the case where image formation of another image has been executed by using another image data, the control section 101 restarts temporarily conveying of the long sheet stopped temporarily so as to make the long sheet into a state of going out from the image forming apparatus by a length necessary for setting the leading end of a succeeding long sheet from which the region where the another image is formed is removed, onto the sheet delivering apparatus. Successively, when the long sheet becomes the above state, the control section 101 stops again the conveying of the long sheet temporarily, and then, in the state that the conveying of the long sheet is stopped temporarily, the control section 101 controls the long sheet so as to be set.

The control section 101 performs at least one of an indication to urge so as to set the long sheet from which the region of the another image has been removed and an indication to confirm whether the long sheet from which the region of the another image has been removed is set or not, on any one of the operation display section 105, a display section of another apparatus, and another display apparatus.

In the case where there is provided a connecting section to set the leading end of the succeeding cut-out long sheet onto the sheet delivering apparatus, the control section 101 controls the connecting section so as to set the leading end of the succeeding long sheet from which the region of the another image has been removed, onto the sheet delivering apparatus 200.

In the case where the leading end of the succeeding long sheet from which the region where the another image is formed has been removed is set onto the sheet delivering apparatus 200, the control section 101 controls to restart sheet feeding by the sheet feeding apparatus 50, image formation by the image forming apparatus 100, and winding up by the sheet delivering apparatus 200.

[Operation (1) of the Present Embodiment]

Hereinafter, description is given to operation (1) of the present embodiment with reference to a flow chart shown in FIG. 4 and an image formation state schematic diagram shown in each of FIG. 10 and FIG. 11.

Figure 4:
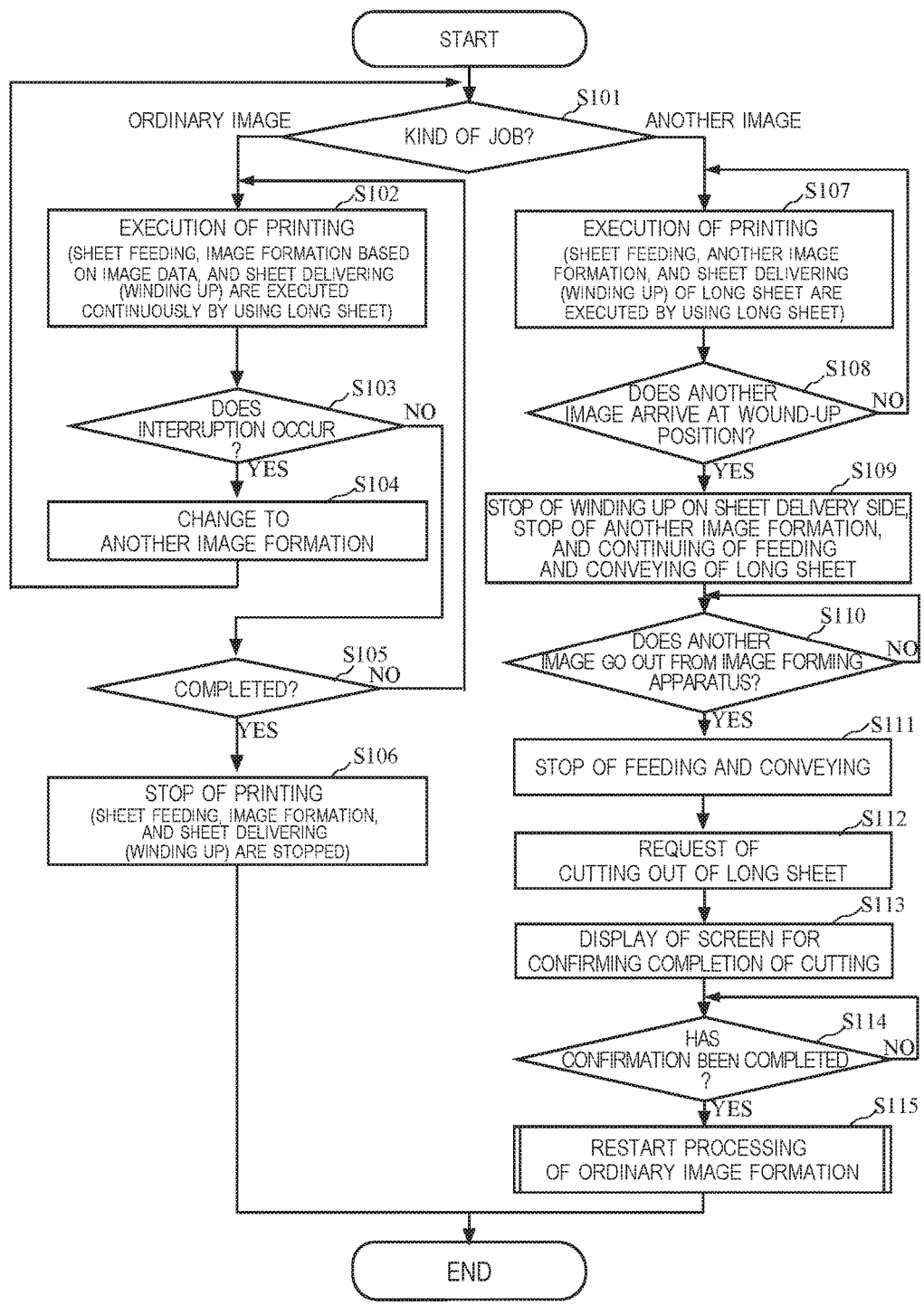
FIG. 4 is a flow chart showing operations of an embodiment of the present invention.

First, the control section 101 judges the kind of a job to be executed (Step S101 in FIG. 4). Herein, as the kind of a job, the following two kinds are assumed. The first kind is ordinary image formation to form an image of ordinary (ordinary image) on a long sheet based on ordinary image data for the purpose of obtaining an output resultant matter, and the second kind is another image formation to form another image based on another image data for adjustment, sample output, and the like.

In the case where a job to be executed is ordinary image formation ("ordinary image" at Step S101 in FIG. 4), the control section 101 controls each section so as to execute feeding of a long sheet by the sheet feeding apparatus 50, image formation of an ordinary image on a long sheet by the image forming section 150, and winding up of a long sheet by the sheet delivering apparatus 200 (Step S102 in FIG. 4).

At the time of image formation of an ordinary image, the control section 101 is watching existence or nonexistence of occurrence of interruption, such as adjustment image formation and sample output (Step S103 in FIG. 4). As the interruption, adjustment image formation, sample output image formation, interruption image formation, etc. correspond to it.

In the case where interruption does not occur (NO at Step S103 in FIG. 4), the control section 101 controls each section to execute sheet feeding, image formation, and sheet delivering (winding up) until a job being executed is completed (Steps S102, S103, and S105 in FIG. 4). In the case where the execution of the job has been completed (YES at Step S105 in FIG. 4), the control section 101 controls each section to stop sheet feeding, image formation, and sheet delivering (winding up) (Step S106 in FIG. 4, End).

On the other hand, in the case where interruption occurs (YES at Step S103 in FIG. 4), the control section 101 changes the kind of a job to be executed from ordinary image formation to another image formation (Step S104 in FIG. 4), and returns to job kind judgment (Step S101 in FIG. 4).

In the case where a job to be executed is another image formation ("another image" at Step S101 in FIG. 4), the control section 101 controls each section to execute sheet feeding of a long sheet by the sheet feeding apparatus 50, image formation of another image onto the long sheet by the image forming section 150, and winding up of a region (a region of an ordinary image) on which a preceding ordinary image is formed, on the long sheet by the sheet delivering apparatus 200 (Step S107 in FIG. 4).

Further, the control section 101 is watching the state of conveying the region of the ordinary image by the preceding ordinary image formation on the long sheet and a region of another image by another image formation on the long sheet to the sheet delivering apparatus 200 (Step S108 in FIG. 4) while executing image formation of current another image (Step S107 in FIG. 4).

Figure 5:
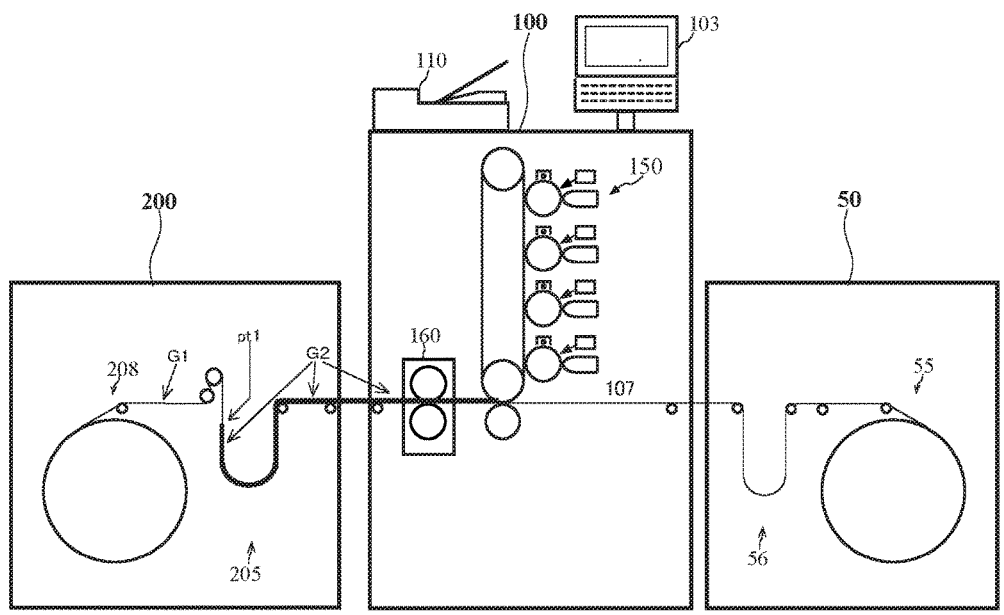
FIG. 5 is an explanatory drawing showing schematically a situation of image formation of an embodiment of the present invention.

Herein, the ordinary image region G1 on the long sheet is wound up by the roll sheet delivering section 208 in the sheet delivering apparatus 200. Successively, when the leading end of the another image region G2 on the long sheet arrives at a wound-up position (pt1 in FIG. 5) (YES at Step S108 in FIG. 4), the control section 101 stops the winding-up operation of the roll sheet delivering section 208 in the sheet delivering apparatus 200 (Step S109 in FIG. 4).

That is, the control section 101 controls to stop the winding-up operation before the region of another image is wound up into the sheet delivering section 208 in the sheet delivering apparatus 200. Whether the leading end of the another image region G2 arrives at the wound-up position or not may be judged by using the sensor 209 or may be determined by calculation based on a transfer timing in the another image formation and a conveying speed of the long sheet.

Further, the control section 101 stops the winding up operation in the sheet delivering apparatus 200, and, in addition, stops image formation of another image in the image forming section 150. However, the control section 101 controls each section to continue sheet feeding and conveying of the long sheet.

Further, in the state that the winding-up operation in the sheet delivering apparatus 200 is stopped as mentioned above, the control section 101 is watching whether the trailing end of the another image region G2 on the long sheet goes to the outside of the image forming apparatus 100 or not, while continuing sheet feeding and conveying of the long sheet (Step S110 in FIG. 4).

This watching may use the sensor 109 and may determine by calculation based on a transfer timing in another image formation and a conveying speed of the long sheet.

Figure 6:
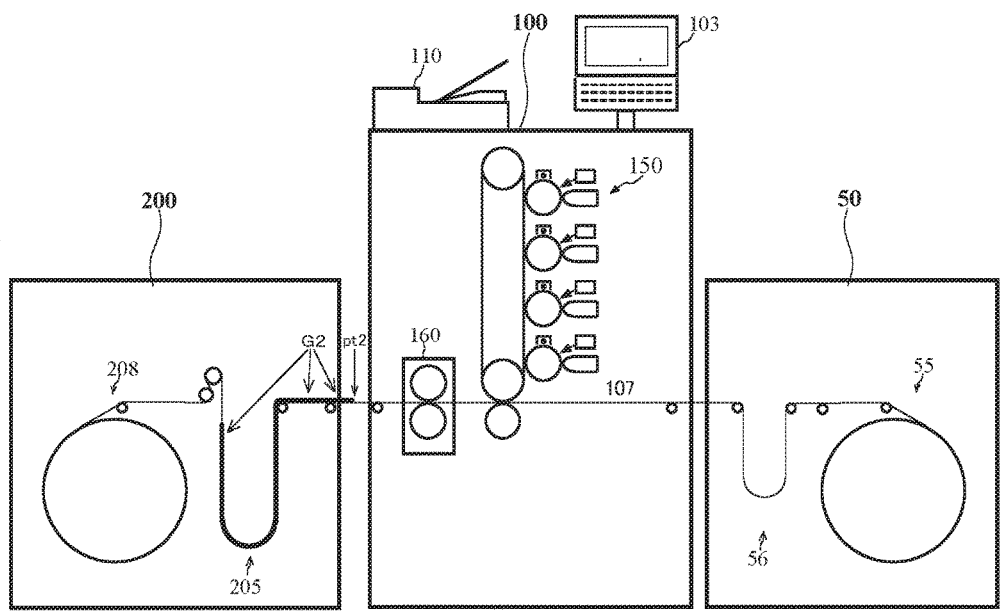
FIG. 6 is an explanatory drawing showing schematically a situation of image formation of an embodiment of the present invention.

Herein, when the trailing end of the another image region G2 on the long sheet arrives at the outside position (pt2 in FIG. 6) of the image forming apparatus 100 (YES at Step S110 in FIG. 4), the control section 101 stops sheet feeding and conveying of the long sheet (Step S111 in FIG. 4). That is, in the state that the region of another image goes out from the image forming apparatus 100, the control section 101 controls to stop conveying of the long sheet temporarily.

Figure 7:
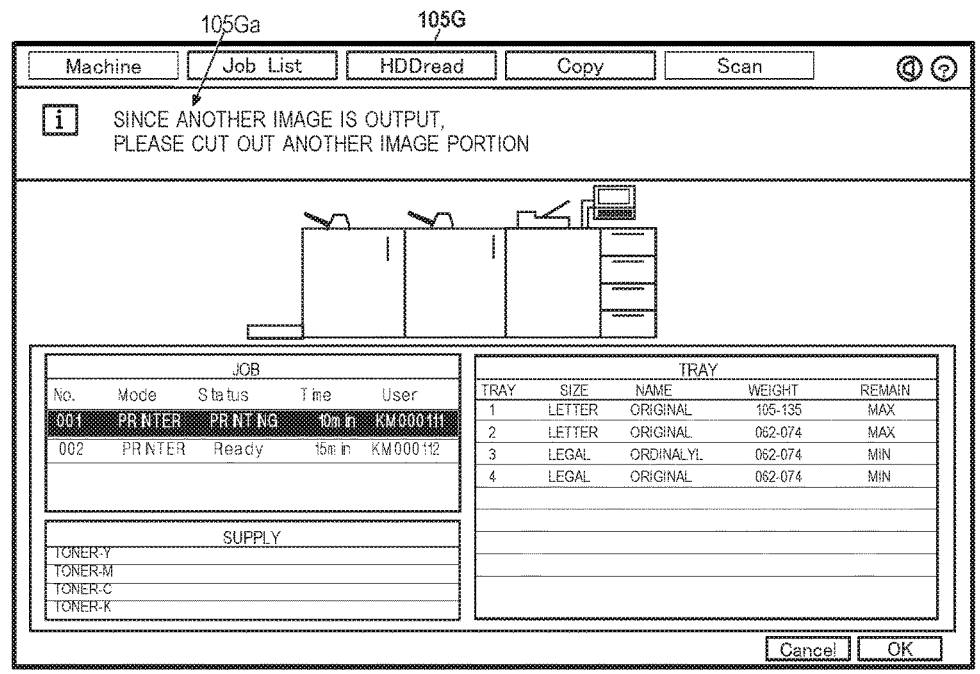
FIG. 7 is an explanatory drawing showing an example of a display screen of an embodiment of the present invention.

Herein, the control section 101 displays a message described below (also refer to FIG. 7) to urge a user to cut on a message display column 105Ga of the operation display section 105 (Step S113 in FIG. 4).

"Since another image is output, please cut out another image portion."

Thereby urging a user to cut out (remove) another image region G2.

Figure 8:
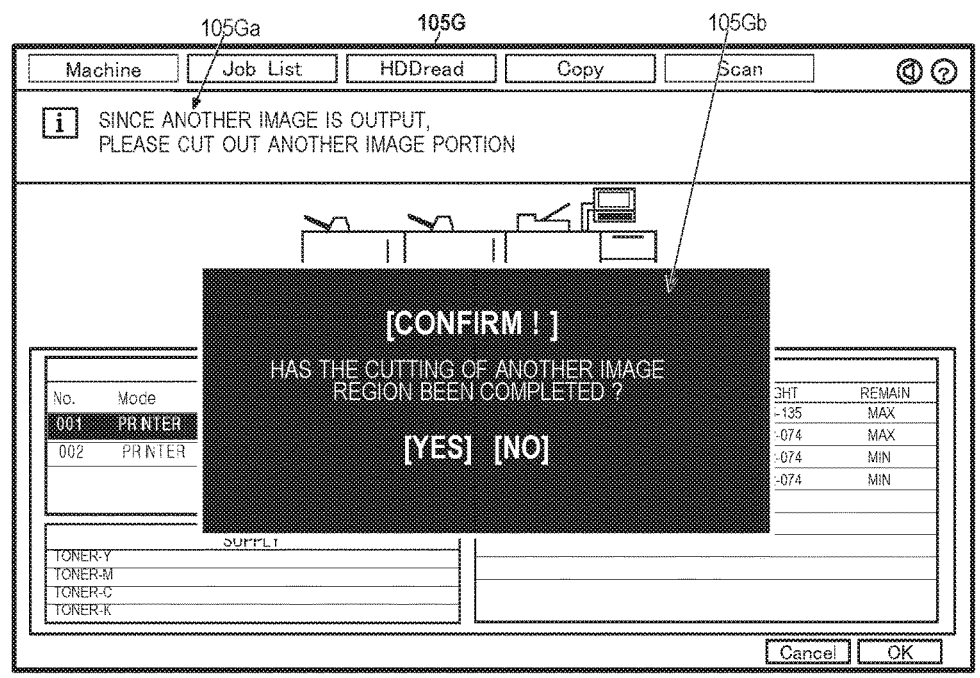
FIG. 8 is an explanatory drawing showing an example of a display screen of an embodiment of the present invention.

A user who looks at such a message on the display column 105G cuts the sheet at the respective positions of pt1 and pt2 by hand or using the cutting section 203, and removes the another image region G2. Further, after a predetermined period of time, the control section 101 displays a confirmation message described below (also refer to FIG. 8) on a pop-up screen 105Gb on the display screen 105G of the operation display section 105 (Step S114 in FIG. 4).

"Has the cutting of another image region been completed?" "Yes", or "No""

That is, by urging a user to cut out the another image region by using the display screen on the operation display section 105, the control section 101 controls such that a region where another image is formed is cut out in the state that conveying of a long sheet is stopped temporarily.

Herein, the control section 101 waits until the user makes an operation to select [yes] showing acknowledgment for the confirmation message mentioned above on the operation display section 105 (NO at Step S114 in FIG. 4). Subsequently, at a time point when the user has made an operation to select [yes] showing acknowledgment on the operation display section 105 (YES at Step S114 in FIG. 4), the control section 101 controls each section to execute restart processing mentioned later (Step S115 in FIG. 4).

With this restart processing, a succeeding long sheet having been cut out is set on the sheet delivering apparatus 200, the processing returns to image formation of an ordinary image, and the image formation for the remaining job is made to be completed. Then, the control section 101 ends the above processing when the restarted image formation of an ordinary image has been completed (End in FIG. 4).

In the case where the sensor 209 in the sheet delivering apparatus 200 can detect excision of the another image region G2, upon receipt of the detection result of the sensor 209, the control section 101 may control each section so as to proceed to the restart processing (Step S115 in FIG. 4).

As mentioned above, at the time of executing image formation of another image by using another image data in the middle of image formation of an ordinary image, conveying of the long sheet is controlled to be stopped temporarily. Thereby, even in the case where image formation of another image is executed in the middle of image formation of an ordinary image, it becomes possible to make another image not to be wound up into the sheet delivery side.

Further, in the case where image formation of another image is executed by using another image data, winding up of the long sheet in the sheet delivering apparatus 200 is controlled to be stopped before the another image region G2 on the long sheet is wound up into the sheet delivering apparatus 200. Thereby, even in the case where image formation of another image is executed in the middle of image formation of an ordinary image, it becomes possible to make another image not to be wound up into the sheet delivery side securely.

Furthermore, in the case where image formation of another image is executed by using another image data, winding up of the long sheet in the sheet delivering apparatus 200 is controlled to be stopped before the another image region G2 on the long sheet is wound up into the sheet delivering apparatus 200, and conveying of the long sheet is controlled so as to make the another image region G2 go out from the image forming apparatus 100. Thereby, even in the case where image formation of another image is executed in the middle of image formation of an ordinary image, it becomes possible to make another image not to be wound up into the sheet delivery side securely.

Further, in the state that another image region G2 goes out from the image forming apparatus 100, conveying of the long sheet is stopped temporarily. Thereby, even in the case where image formation of another image is executed in the middle of image formation of an ordinary image, it becomes possible to make another image not to be wound up to the sheet delivery side securely.

Further, at least one of an indication (FIG. 7) to urge to remove a region where another image is formed and an indication (FIG. 8) to confirm whether a region where another image is formed is removed or not is performed on the operation display section 105. Thereby, it becomes possible for a user to remove another image. Accordingly, even in the case where image formation of another image is executed in the middle of image formation of an ordinary image, it becomes possible to make another image not to be wound up into the sheet delivery side securely.

The indication (FIG. 7) to urge to remove a region where another image is formed and the indication (FIG. 8) to confirm whether a region where another image is formed is removed or not may be displayed on a single display screen.

Further, in the case where there is provided the cutting section 203 to cut out a long sheet, the cutting section 203 is controlled to cut out (excise) the long sheet in the state that conveying is stopped temporarily at each of the leading end and the trailing end of a region of another image. Thereby, it becomes possible to remove another image. Accordingly, even in the case where image formation of another image is executed in the middle of image formation of an ordinary image, it becomes possible to make another image not to be wound up to the sheet delivery side securely.

That is, in the case where the cutting section 203 exists, in place of urging a user to cut out by a display screen on the operation display section 105, the control section 101 controls the cutting section 203, thereby controlling a region where another image is formed, so at to be cut out.

[Operation (2) of the Present Embodiment]

Figure 9:
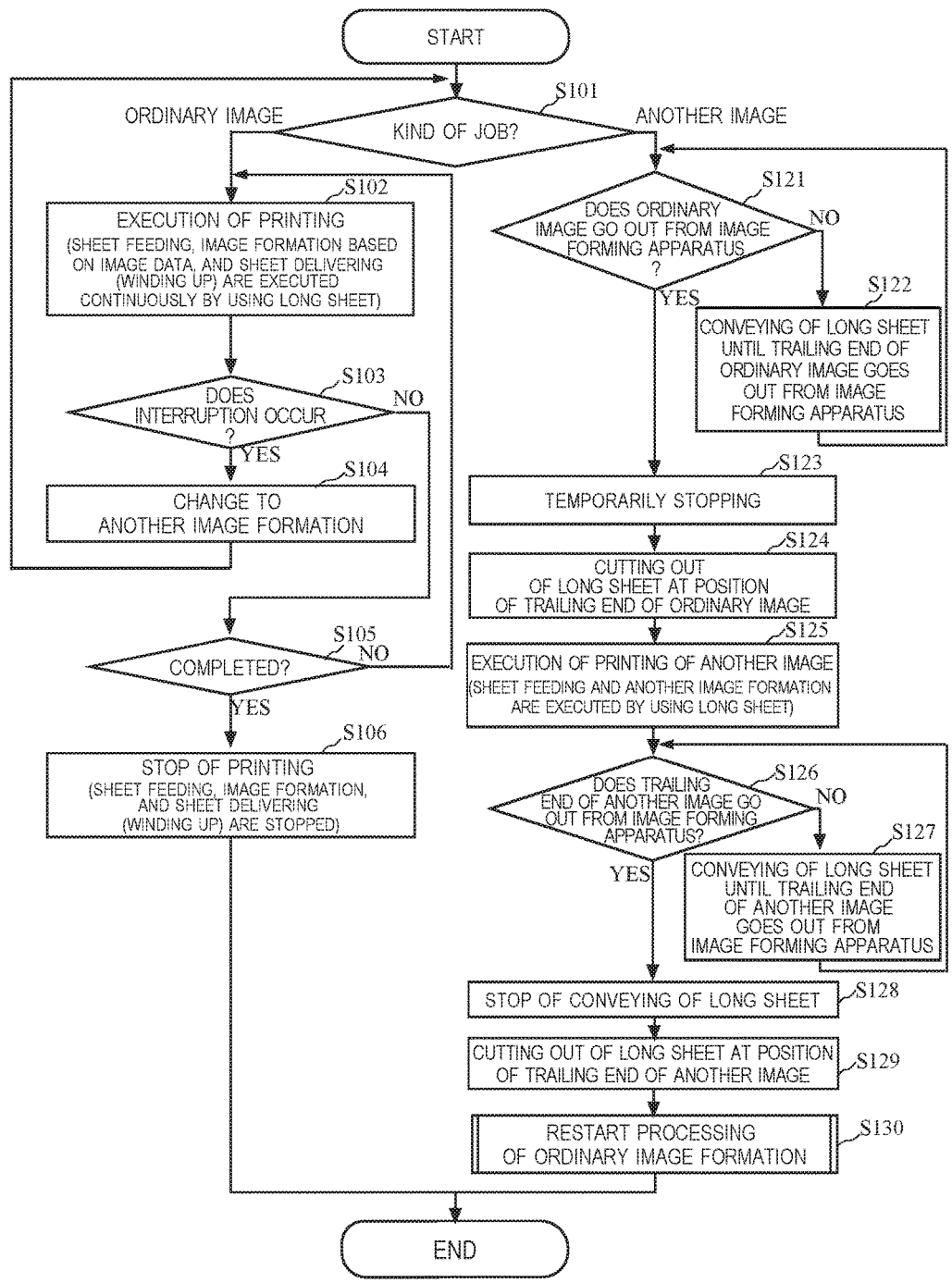
FIG. 9 is a flow chart showing operations of an embodiment of the present invention.

Hereinafter, description is given to operation (2) of the present embodiment with reference to a flow chart shown in FIG. 9 and an image formation state schematic diagram shown in each of FIG. 10 and FIG. 11. In FIG. 9, the same processing with that in FIG. 4 having been already described is provided with the same step number, whereby duplicated description will be simplified.

Figure 10:
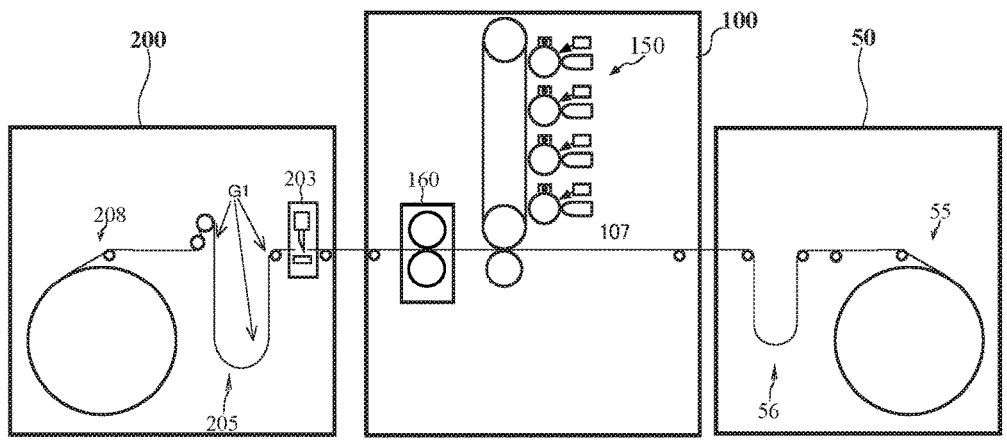
FIG. 10 is an explanatory drawing showing schematically a situation of image formation of an embodiment of the present invention.

Further, in operation (2) of this embodiment, the cutting section 203 is assumed to be disposed at any position after the fixing section 160 of the image forming apparatus 100 and before the roll sheet delivering section 208 (refer to FIG. 10).

First, the control section 101 judges the kind of a job to be executed (Step S101 in FIG. 9). In the case where a job to be executed is image formation of an ordinary image ("ordinary image" at Step S101 in FIG. 9), the control section 101 controls each section so as to execute feeding of a long sheet by the sheet feeding apparatus 50, image formation of an ordinary image on the long sheet by the image forming section 150, and winding up of the long sheet by the sheet delivering apparatus 200 (Step S102 in FIG. 9).

Further, at the time of image formation of an ordinary image, the control section 101 is watching existence or nonexistence of occurrence of interruption, such as adjustment image formation and sample output image formation (Step S103 in FIG. 9). In the case where interruption does not occur (NO at Step S103 in FIG. 9), the control section 101 controls each section to execute sheet feeding, image formation, and sheet delivering (winding up) until a job being executed is completed (Steps S102, S103, and S105 in FIG. 9). In the case where the execution of the job has been completed (YES at Step S105 in FIG. 9), the control section 101 control each section to stop sheet feeding, image formation, and sheet delivering (winding up) (Step S106 in FIG. 9, End).

On the other hand, in the case where interruption occurs (YES at Step S103 in FIG. 9), the control section 101 changes the kind of a job to be executed from image formation of an ordinary image to image formation of another image (Step S104 in FIG. 9), and returns to job kind judgment (Step S101 in FIG. 9).

In the case where the job to be executed is image formation of another image ("another image" at Step S101 in FIG. 9), the control section 101 controls each section to execute sheet feeding, conveying and sheet delivering (winding up) in the state that image formation is not executed, and judges whether all regions (ordinary image region) where preceding ordinary images are formed go out from the image forming apparatus 100 (Step S121 in FIG. 9).

In the case where the trailing end of the preceding ordinary image region do not go out from the image forming apparatus 100 (NO at Step S121 in FIG. 9), the control section 101 controls each section to execute sheet feeding, conveying, and sheet delivering (winding up) in the state that image formation is not executed until the trailing end of the ordinary image region goes out from the image forming apparatus 100 (Step S122 in FIG. 9).

In the case where the trailing end of the preceding ordinary image region goes out from the image forming apparatus 100 (YES at Step S121 in FIG. 9), the control section 101 controls each section to stop sheet feeding, conveying, and sheet delivering (winding up) temporarily (Step S123 in FIG. 9). As this temporarily stopping, the control section 101 controls the above-mentioned conveying and temporarily stopping such that the trailing end of the preceding ordinary image region locates on the upstream side of the cutting section 203. Then, the control section 101 controls the cutting section 203 so as to cut the long sheet at the position of the trailing end of the preceding ordinary image region (Step S124 in FIG. 9, and refer to FIG. 10). That is, as shown in FIG. 10, the trailing end of the ordinary image region G1 is cut out by the cutting section 203.

Herein, the control section 101 controls the sheet feeding apparatus 50, the image forming section 150, and the image formation conveying section 107 to execute image formation based on another image data on the long sheet (Step S125 in FIG. 9). In FIG. 11, forming of another image region G2 on the long sheet is started.

In the case where image formation of another image (Step S125 in FIG. 9) has been completed, the control section 101 controls each section to execute sheet feeding and conveying in the state that image formation is not executed, and judges whether all the another image region goes out from the image forming apparatus 100 (Step S126 in FIG. 9).

In the case where the trailing end of the another image region does not go out from the image forming apparatus 100 (NO at Step S126 in FIG. 9), the control section 101 controls each section to execute sheet feeding and conveying in the state that image formation is not executed until the trailing end of the another image region goes out from the image forming apparatus 100 (Step S127 in FIG. 9).

In the case where the trailing end of the another image region goes out from the image forming apparatus 100 (YES at Step S126 in FIG. 9), the control section 101 controls each section to stop sheet feeding and conveying temporarily (Step S128 in FIG. 9).

Figure 12:
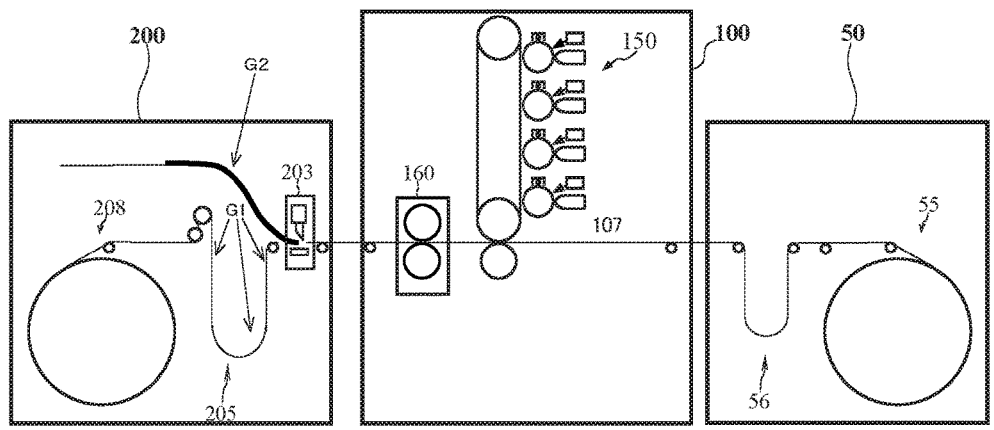
FIG. 12 is an explanatory drawing showing schematically a situation of image formation of an embodiment of the present invention.

As this temporarily stopping, the control section 101 controls the above-mentioned conveying and temporarily stopping such that the trailing end of the another image region locates on the upstream side of the cutting section 203. Then, the control section 101 controls the cutting section 203 so as to cut out the long sheet at the position of the trailing end of the another image region (Step S129 in FIG. 9, and refer to FIG. 12). That is, as shown in FIG. 12, the trailing end of the another image region G2 is cut out by the cutting section 203.

Whether the trailing end of the above another image formation region G2 arrives at the cut-out position or not may be judges by using the sensor 109 or the sensor 209 or may be determined by calculation based on a transfer timing in the image formation of another image and the conveying speed of the long sheet.

Figure 13:
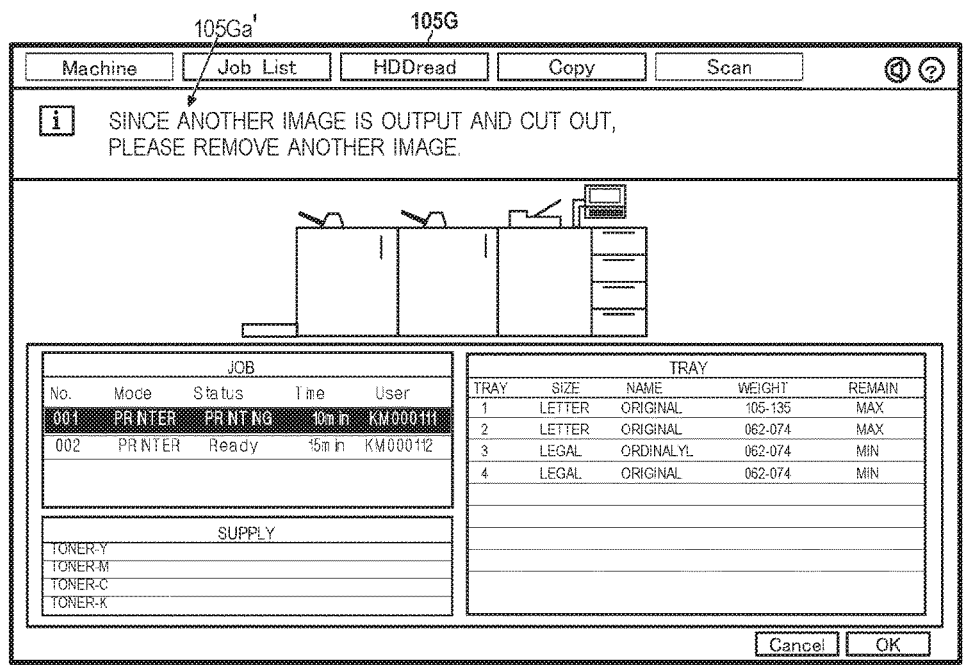
FIG. 13 is an explanatory drawing showing an example of a display screen of an embodiment of the present invention.

Herein, the control section 101 may display a message described below (also refer to 105Ga' in FIG. 13) to urge a user to remove on a message display column 105Ga of the display screen 105G of the operation display section 105.

"Since another image is output and cut out, please remove another image."

Herein, the control section 101 controls each section to execute restart processing mentioned later (Step S130 in FIG. 9). With this restart processing, the leading end of a succeeding long sheet from which the region of another image are cut out is set onto the sheet delivering apparatus 200, processing returns to image formation of an ordinary image, and the image formation for the remaining job is made to be completed. Then, the control section 101 ends the above processing when the restarted image formation of an ordinary image has been completed (End in FIG. 9).

As mentioned above, in the case where there is provided the cutting section 203 to cut a long sheet, the cutting section 203 is controlled to cut out (excise) a region of another image in the state that conveying is stopped temporarily at each of the leading end of the another image region (the trailing end of the ordinary image region) and the trailing end of the another image region (the leading end of a succeeding long sheet). Thereby, it becomes possible to remove another image. Accordingly, even in the case where image formation of another image is executed in the middle of image formation of an ordinary image, it becomes possible to make another image not to be wound up into the sheet delivery side securely.

Figure 11:
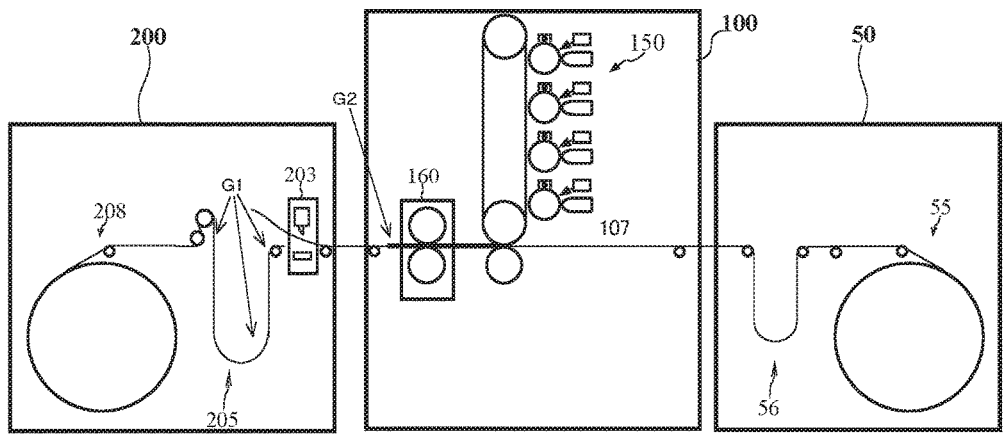
FIG. 11 is an explanatory drawing showing schematically a situation of image formation of an embodiment of the present invention.

FIG. 11 and FIG. 12 each shows an example in which another image region G2 exists on the cut-out sheet and there exists a region where another image is not formed on the former half of the cut-out sheet. However, if possible, image formation of another image may be started subsequently to the trailing end of the ordinary image region. Similarly, image formation of an ordinary image may be restarted subsequently to the trailing end of another image region.

Further, in each of FIG. 11 and FIG. 12, another image region G2 may be conveyed on a course different from an ordinary course in the sheet delivering apparatus 200. However, another image region G2 may be delivered to the outside of the sheet delivering apparatus 200. Furthermore, in the case where the cutting section 203 exists at the middle between the image forming apparatus 100 and the sheet delivering apparatus 200, it is also possible to deliver the another image region G2 toward the outside without making the another image region G2 enter the sheet delivering apparatus 200.

[Operation (3) of the Present Embodiment]

Hereinafter, description is given to operation (3) of the present embodiment with reference to a flow chart shown in FIG. 14 and an image formation state schematic diagram shown in each of FIG. 15 and FIG. 16. Operation (3) of this embodiment relates to restarting of image formation of an ordinary image after image formation of another image.

Figure 14:
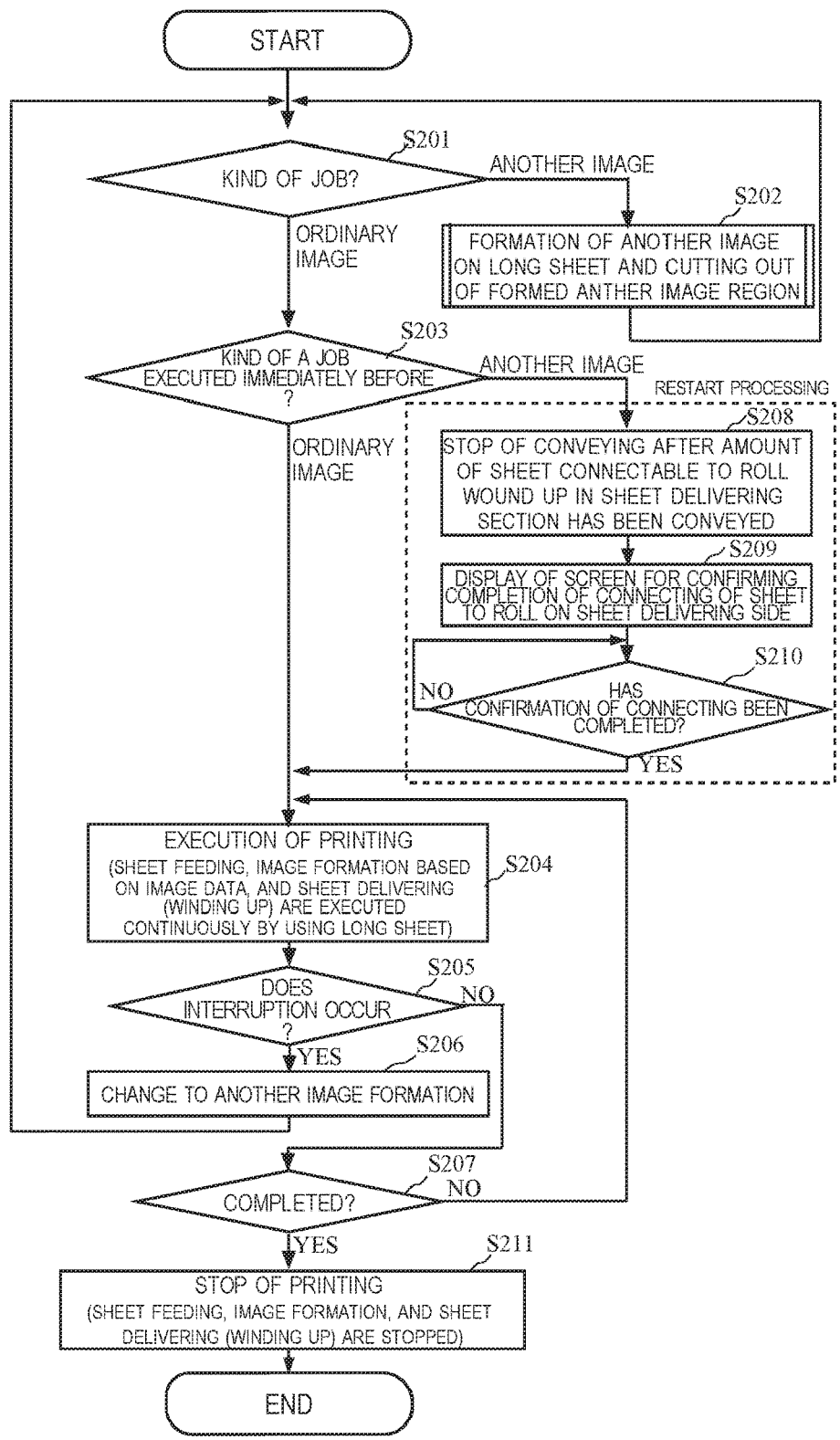
FIG. 14 is a flow chart showing operations of an embodiment of the present invention.

First, the control section 101 judges the kind of a job to be executed (Step S201 in FIG. 14). In the case where a job to be executed is image formation of another image ("another image" at Step S201 in FIG. 14), the control section 101 controls so as to form another image on a long sheet, to cut out the region of the formed another image, and to remove the cut-out another image region (Step S202 in FIG. 14). The forming of another image, cutting, and removing in Step S202 are similar to those described in operation (1) of the embodiment and operation (2) of the embodiment.

On the other hand, in the case where the kind of a job to be executed is image formation of an ordinary image ("ordinary image" at Step S201 in FIG. 14), the control section 101 judges whether the kind of a job having been executed immediately before is image formation of an ordinary image or image formation of another image (Step S203 in FIG. 14).

In the case where the kind of a job to be executed is image formation of an ordinary image and the kind of a job having been executed immediately before is also image formation of an ordinary image, the control section 101 controls each section so as to execute feeding of a long sheet by the sheet feeding apparatus 50, image formation of an ordinary image on the long sheet by the image forming section 150, and winding up of the long sheet by the sheet delivering apparatus 200 (Step S204 in FIG. 14).

Further, at the time of image formation of an ordinary image, the control section 101 is watching existence or nonexistence of occurrence of interruption, such as image formation of an adjustment image and sample output (Step S205 in FIG. 14). In the case where interruption does not occur (NO at Step S205 in FIG. 14), the control section 101 controls each section to execute sheet feeding, image formation, and sheet delivering (winding up) until a job being executed is completed (Steps S204, S205, and S207 in FIG. 14).

In the case where the execution of the job has been completed without change (YES at Step S204 in FIG. 14), the control section 101 controls each section to stop sheet feeding, image formation, and sheet delivering (winding up) (Step S211 in FIG. 14, End).

On the other hand, in the case where interruption occurs (YES at Step S205 in FIG. 14), the control section 101 changes the kind of a job to be executed from image formation of an ordinary image to image formation of another image (Step S206 in FIG. 14), and returns to job kind judgment (Step S201 in FIG. 14).

On the other hand, in the case where the kind of a job to be executed is image formation of an ordinary image and the kind of a job having been executed immediately before is image formation of another image ("another image" at Step S203 in FIG. 14), restart processing described later is executed. The restart processing described later corresponds to the detail of the restart processing at each of S130 in FIG. 9 and S115 in FIG. 4.

Herein, a case where the kind of a job to be executed is image formation of an ordinary image and the kind of a job having been executed immediately before is image formation of another image is the state that interruption occurs in the middle of image formation of an ordinary image, image formation of another image is executed, and a region of another image is cut out, and removed.

Figure 15:
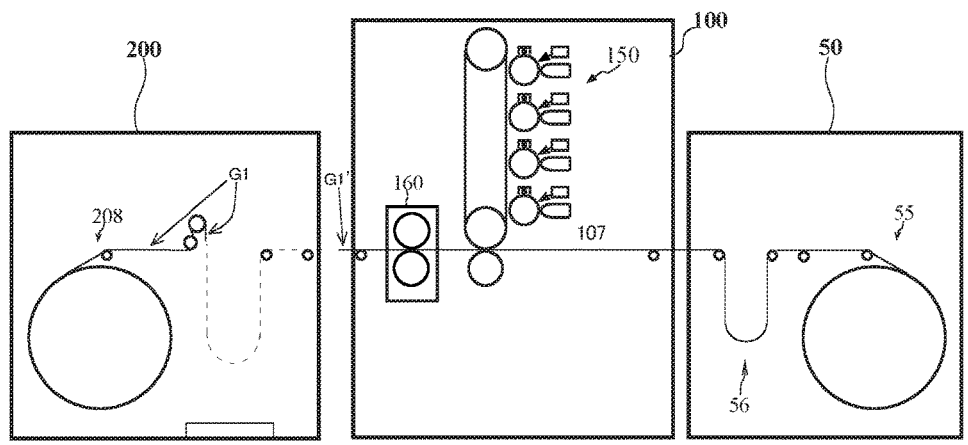
FIG. 15 is an explanatory drawing showing schematically a situation of image formation of an embodiment of the present invention.

In this case, as shown in FIG. 15, the trailing end of a long sheet G1 of an ordinary image region preceding to the removed another image region (a broken line in FIG. 15) and the leading end of a long sheet G1' where image formation of an ordinary image is to be executed subsequently after the removed another image region (a broken line in FIG. 15) are made in the state of being separated from each other by cutting out.

Figure 16:
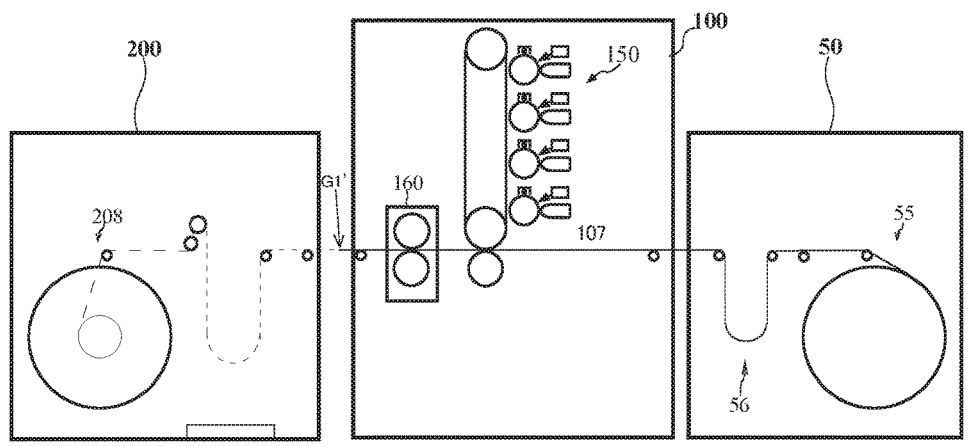
FIG. 16 is an explanatory drawing showing schematically a situation of image formation of an embodiment of the present invention.

Alternatively, as shown in FIG. 16, there may be a case where a long sheet G1 of an ordinary image region preceding to the removed another image region is also removed. Then, the control section 101 controls the sheet feeding apparatus 50 and the image formation conveying section 107 to convey a necessary length of the long sheet G1' so as to enable the leading end of the long sheet G1' where image formation of an ordinary image is to be executed, to set onto the roll sheet delivering section 208 (Step S208 in FIG. 14).

Herein, at this time, the control section 101 can calculate the length of the long sheet G1' to be conveyed based on a position where the another image region is cut out, the dimension of the sheet delivery adjusting section 205, a sheet remaining situation in the roll sheet delivering section 208, and the like. As shown in each of FIG. 17 and FIG. 18, the conveyed long sheet G1' may be slacken in the sheet delivery adjusting section 205, or may be guided into a not-shown exclusive-use conveyance passage or a guide.

Figure 17:
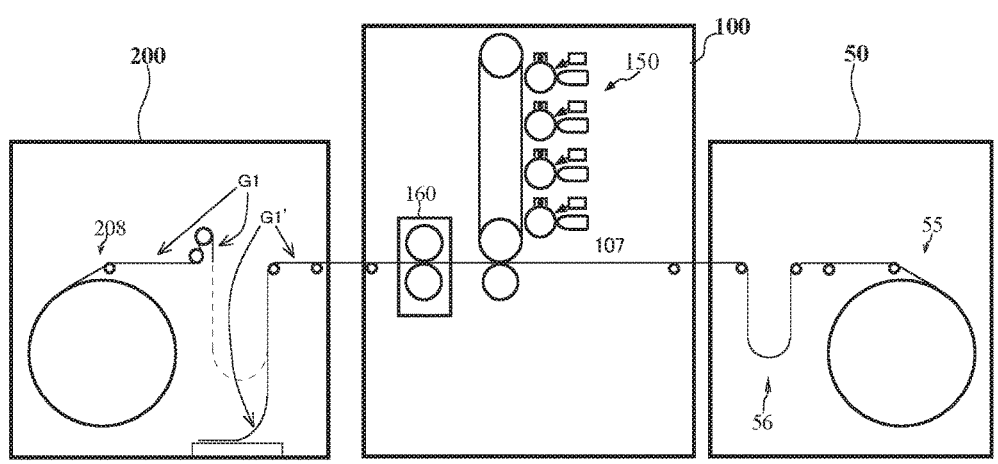
FIG. 17 is an explanatory drawing showing schematically a situation of image formation of an embodiment of the present invention.

As the state that the leading end of the long sheet G1' is set onto the roll sheet delivering section 208, FIG. 17 shows a case where the long sheet G1 of the ordinary image region preceding to the another image region remains and the leading end of the succeeding long sheet G1' is connected to the trailing end of the long sheet G1. In this case, for the connecting, various techniques such as pasting and tape adhesion may be used.

Figure 18:
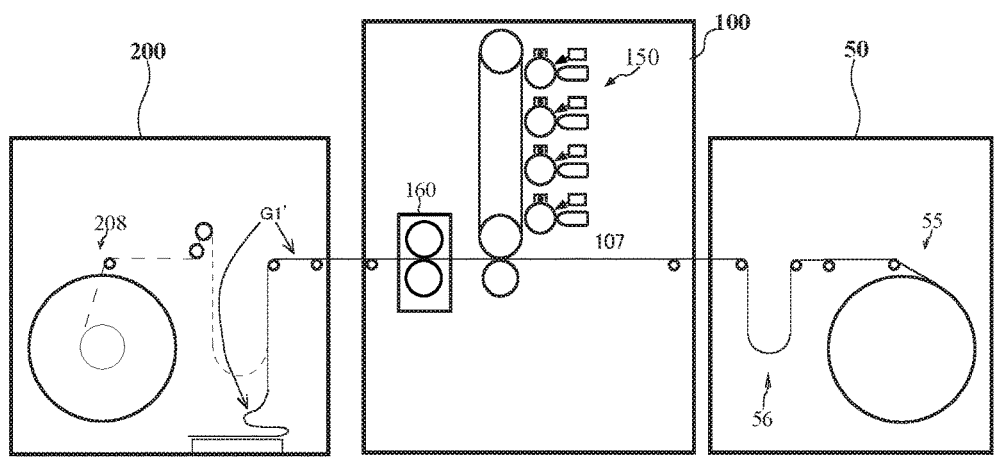
FIG. 18 is an explanatory drawing showing schematically a situation of image formation of an embodiment of the present invention.

Further, FIG. 18 shows a case where the long sheet G1 of the ordinary image region preceding to another image region has been removed and the leading end of the succeeding long sheet G1' is directly connected to a roll of the roll sheet delivering section 208. In this case, in order to directly set to the roll sheet delivering section 208, a region necessary for connecting is longer than that in FIG. 17. For the setting in this case, various techniques such as inserting of the long sheet G1' into a sheet clipping section and pasting by using a paste or a tape may be used.

Figure 19:
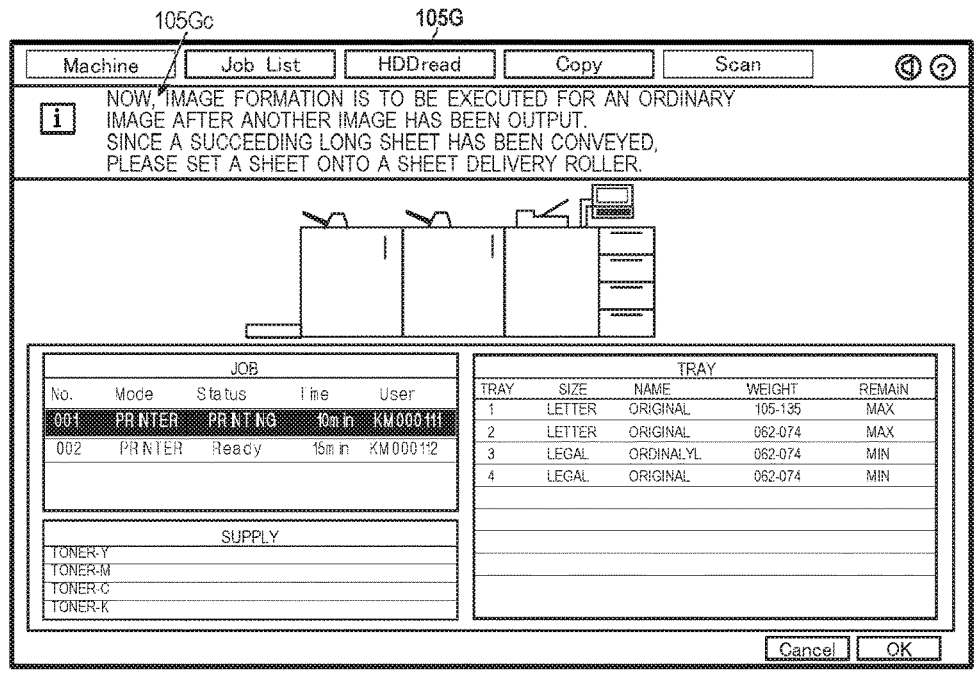
FIG. 19 is an explanatory drawing showing an example of a display screen of an embodiment of the present invention.

Herein, the control section 101 may display a message described below (also refer to FIG. 19) to urge a user to set a sheet on a message display column 105Gc of the display screen 105G of the operation display section 105 (Step S209 in FIG. 14).

"Now, image formation is to be executed for an ordinary image after another image has been output. Since a succeeding long sheet has been conveyed, please set a sheet onto a sheet delivery roller."

Thereby, a user is urged to set the long sheet G1'.

A user who looks at the message on the display column 105G sets the long sheet G1' directly to the roll of the roll sheet delivering section 208 by hand or connects the leading end of the long sheet G1' to the trailing end of the preceding long sheet G1.

Figure 20:
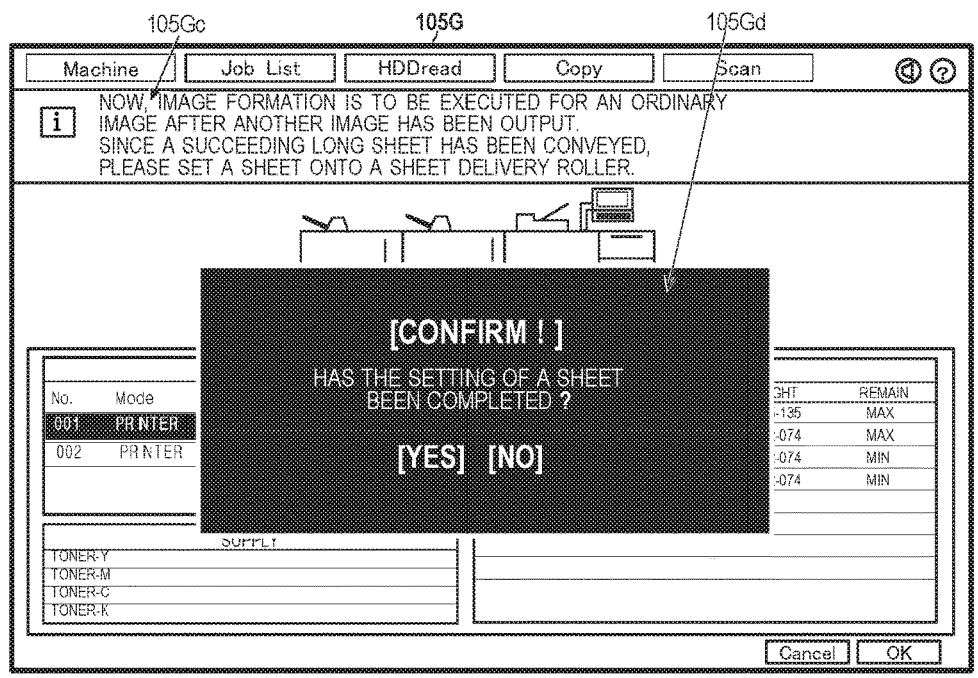
FIG. 20 is an explanatory drawing showing an example of a display screen of an embodiment of the present invention.

Further, after a predetermined period of time, the control section 101 displays a confirmation message described below (also refer to FIG. 20) as a pop-up screen 105Gd on the display screen 105G of the operation display section 105 (Step S210 in FIG. 14).

"Has the setting of a sheet been completed?"Yes", or "No""

That is, by urging a user to set the succeeding long sheet G1' by using the display screen on the operation display section 105, the control section 101 controls such that preparation of image formation of an ordinary image is executed in the state that conveying of a long sheet is stopped temporarily. The indication to urge so as to set a sheet (FIG. 19) and the indication to confirm whether a sheet has been set (FIG. 19) may be displayed on a single display screen.

Herein, the control section 101 waits until the user makes an operation to select [yes] showing acknowledgment for the confirmation message mentioned above on the operation display section 105 (NO at Step S210 in FIG. 14). Subsequently, at a time point when the user has made an operation to select [yes] showing acknowledgment on the operation display section 105 (YES at Step S210 in FIG. 14), the control section 101 controls each section to execute image formation of an ordinary image (Step S204 in FIG. 14).

With the ordinary image formation processing restarted in this way, the image formation for the remaining job is made to be completed. Then, the control section 101 ends the above processing when the restarted image formation of an ordinary image has been completed (End in FIG. 14). In the case where a not-shown connecting section is provided in the sheet delivering apparatus 200, the control section 101 may set a succeeding long sheet G1' by using the connecting section, without giving the indication mentioned above.

In the case where the sensor 209 in the sheet delivering apparatus 200 can detect the setting of the succeeding long sheet G1', upon receipt of the detection result of the sensor 209, the control section 101 may control each section so as to restart image formation of an ordinary image (YES at Step S210 in FIG. 14, S204).

As mentioned above, in the case where image formation of another image has been executed by using another image data, conveying of the long sheet stopped temporarily is restarted temporarily so as to make the long sheet into a state of going out from the image forming apparatus by a length necessary for setting the leading end of a succeeding long sheet from which the region where the another image is formed has been removed, onto the sheet delivering apparatus, and when the long sheet becomes the above state, the control section controls to stop again conveying of the long sheet temporarily, and to set the long sheet in the state that conveying of the long sheet is stopped temporarily.

With the control mentioned above, it becomes possible to set the long sheet being in the state that another image has been removed. Accordingly, even in the case where image formation of another image is executed in the middle of image formation of an ordinary image, it becomes possible to make another image not to be wound up to the sheet delivery side securely.

Further, at least one of an indication to urge to set a long sheet from which a region of another image is removed and an indication to confirm whether a long sheet from which a region of another image is removed is set or not is performed. Thereby, it becomes possible to set a long sheet being in the state that another image is removed. Accordingly, even in the case where image formation of another image is executed in the middle of image formation of an ordinary image, it becomes possible to make another image not to be wound up to the sheet delivery side securely.

Further, in the case where there is provided a connecting section to set the leading end of a cut-out long sheet onto the sheet delivering apparatus 200, the connecting section is controlled so as to set the leading end of a long sheet from which a region of another image is removed, onto the sheet delivering apparatus 200. Thereby, it becomes possible to set a long sheet being in the state that another image is removed. Accordingly, even in the case where image formation of another image is executed in the middle of image formation of an ordinary image, it becomes possible to make another image not to be wound up to the sheet delivery side securely.

Further, when the leading end of a succeeding long sheet from which a region where another image is formed is removed is set onto the sheet delivering apparatus 200, sheet feeding by the sheet feeding apparatus, image formation by the image forming apparatus 100, and winding up by the sheet delivering apparatus are controlled so as to be restarted. Thereby, it becomes possible to execute an ordinary image formation operation by using the long sheet from which another image has been removed, and which is in the state of being set. Accordingly, even in the case where image formation of another image is executed in the middle of image formation of an ordinary image, it becomes possible to make another image not to be wound up to the sheet delivery side securely.

In FIG. 17 and FIG. 18, it is preferable that after the long sheet G1' has been set onto the sheet delivering apparatus 200, image formation is started in the image forming section 150. However, in the case where position control can executed correctly, image formation may be performed on a region which is conveyed in order to set the long sheet G1' and slacked.

What is claimed is:

1. An image forming system, comprising:
a sheet feeding apparatus which feeds a long sheet with a sheet length in a conveying direction longer than a sheet of a fixed sheet size;
an image forming apparatus which performs image formation based on image data while conveying the long sheet being fed from the sheet feeding apparatus;
a sheet delivering apparatus which winds up the long sheet subjected to the image formation; and
a control apparatus which controls the sheet feeding apparatus, the image forming apparatus, and the sheet delivering apparatus;
wherein the control apparatus controls the sheet feeding apparatus, the image forming apparatus, and the sheet delivering apparatus so as to perform image formation based on the image data while conveying the long sheet at a constant speed,
wherein at a time of executing image formation of another image based on another image data other than the image data in the middle of the image formation based on the image data, the control apparatus controls to stop conveying of the long sheet temporarily, and controls to cut out a region where the another image is formed thereby separating the long sheet, in the state of stopping conveying of the long sheet temporarily, and
wherein in a case in which the image formation of the another image has been executed by using the another image data, the control apparatus controls to stop winding up of the long sheet in the sheet delivering apparatus before the region where the another image is formed on the long sheet is wound up into the sheet delivering apparatus, and in a state in which the winding up of the long sheet is stopped, the control apparatus controls to continue the sheet feeding and conveying of the long sheet such that the region where the another image is formed on the long sheet goes out from the image forming apparatus, wherein the control apparatus continues the sheet feeding and conveying of the long sheet until a trailing end of the region where the another image is formed goes out from the image forming apparatus.

2. The image forming system described in claim 1, wherein in a state that the region where the another image is formed on the long sheet has gone out from the image forming apparatus, the control apparatus controls to stop conveying of the long sheet temporarily.

3. The image forming system described in claim 1, further comprising a display, wherein the control apparatus controls the display to display at least one of an indication to urge to remove the region where the another image is formed and an indication to confirm whether the region where the another image is formed is removed or not.

4. The image forming system described in claim 1, further comprising a cutting section configured to cut the long sheet, wherein the control apparatus controls the cutting section to cut out a leading end of the region where the another image is formed on the long sheet in the state that conveying of the long sheet is stopped temporarily, and to cut out the trailing end of the region where the another image is formed on the long sheet in the state that conveying of the long sheet is stopped temporarily.

5. The image forming system described in claim 1, wherein in a case in which the image formation of the another image has been executed by using the another image data, the control apparatus controls to restart temporarily conveying of the long sheet which has been stopped temporarily, so as to make the long sheet into a state of going out from the image forming apparatus by a length necessary for setting a leading end of a succeeding long sheet from which the region where the another image is formed has been removed, onto the sheet delivering apparatus, and then the control apparatus controls to stop again conveying of the long sheet temporarily, and to set the long sheet in the state that conveying of the long sheet is stopped temporarily.

6. The image forming system described in claim 5, further comprising a display, wherein the control apparatus controls the display to display at least one of an indication to urge to set the succeeding long sheet from which the region of the another image has been removed and an indication to confirm whether the succeeding long sheet from which the region of the another image has been removed is set or not.

7. The image forming system described in claim 5, further comprising a connecting section configured to set a leading end of a cut-out long sheet onto the sheet delivering apparatus, wherein the control apparatus controls the connecting section so as to set the leading end of the succeeding long sheet from which the region of the another image has been removed, onto the sheet delivering apparatus.

8. The image forming system described in claim 5, wherein in a case in which the leading end of the succeeding long sheet from which the region where the another image is formed has been removed is set onto the sheet delivering apparatus, the control apparatus controls to restart sheet feeding by the sheet feeding apparatus, image formation by the image forming apparatus, and winding up by the sheet delivering apparatus.

9. An image forming apparatus connectable to a sheet feeding apparatus and a sheet delivering apparatus, comprising:
a controller which performs control to feed a long sheet with a sheet length in a conveying direction longer than a sheet of a fixed sheet size from the sheet feeding apparatus, to perform image formation based on image data while conveying the long sheet, and to output the long sheet subjected to image formation to the sheet delivering apparatus;
wherein the controller controls the sheet feeding apparatus, the image forming apparatus, and the sheet delivering apparatus so as to perform image formation based on the image data while conveying the long sheet at a constant speed,
wherein at a time of executing image formation of another image based on another image data other than the image data in the middle of the image formation based on the image data, the controller controls to stop conveying of the long sheet temporarily, and controls to cut out a region where the another image is formed thereby separating the long sheet, in the state of stopping conveying of the long sheet temporarily, and
wherein in a case in which the image formation of the another image has been executed by using the another image data, the controller controls to stop winding up of the long sheet in the sheet delivering apparatus before the region where the another image is formed on the long sheet is wound up into the sheet delivering apparatus, and in a state in which the winding up of the long sheet is stopped, the controller controls to continue the sheet feeding and conveying of the long sheet such that the region where the another image is formed on the long sheet goes out from the image forming apparatus, wherein the control apparatus continues the sheet feeding and conveying of the long sheet until a trailing end of the region where the another image is formed goes out from the image forming apparatus.

10. The image forming apparatus described in claim 9, wherein in a state that the region where the another image is formed on the long sheet has gone out from the image forming apparatus, the controller controls to stop conveying of the long sheet temporarily.

11. The image forming apparatus described in claim 9, further comprising a display, wherein the controller controls the display to display an indication to confirm whether the region where the another image is formed is removed or not.

12. The image forming apparatus described in claim 9, wherein the image forming apparatus is connectable to a cutting section, and the controller controls the cutting section to cut out a leading end of the region where the another image is formed on the long sheet in the state that conveying of the long sheet is stopped temporarily, and to cut out the trailing end of the region where the another image is formed on the long sheet in the state that conveying of the long sheet is stopped temporarily.

13. The image forming apparatus described in claim 9, wherein in a case in which the image formation of the another image has been executed by using the another image data, the controller controls to restart temporarily conveying of the long sheet which has been stopped temporarily, so as to make the long sheet into a state of going out from the image forming apparatus by a length necessary for setting a leading end of a succeeding long sheet from which the region where the another image is formed has been removed, onto the sheet delivering apparatus, and then the controller controls to stop again conveying of the long sheet temporarily, and to set the long sheet in the state that conveying of the long sheet is stopped temporarily.

14. The image forming apparatus described in claim 13, further comprising a display, wherein the controller controls the display to display an indication to confirm whether the succeeding long sheet from which the region of the another image has been removed is set or not.

15. The image forming apparatus described in claim 13, wherein the image forming apparatus is connectable to a connecting section configured to set a leading end of a cut-out long sheet onto the sheet delivering apparatus, and the controller controls the connecting section so as to set the leading end of the succeeding long sheet from which the region of the another image has been removed, onto the sheet delivering apparatus.

16. The image forming apparatus described in claim 13, wherein in a case in which the leading end of the succeeding long sheet from which the region where the another image is formed has been removed is set onto the sheet delivering apparatus, the controller controls to restart sheet feeding by the sheet feeding apparatus, image formation by the image forming apparatus, and winding up by the sheet delivering apparatus.

17. A non-transitory computer-readable recording medium having stored thereon an image formation control program executable by a computer of an image forming system including a sheet feeding apparatus, an image forming apparatus, and a sheet delivering apparatus, wherein the sheet feeding apparatus feeds a long sheet with a sheet length in a conveying direction longer than a sheet of a fixed sheet size, the image forming apparatus performs image formation based on image data while conveying the long sheet being fed from the sheet feeding apparatus, and the sheet delivering apparatus winds up the long sheet subjected to the image formation, the program being executable by the computer to perform operations comprising:

controlling the sheet feeding apparatus, the image forming apparatus, and the sheet delivering apparatus at an ordinary time so as to perform image formation based on the image data while conveying the long sheet at a constant speed, in a case in which the image forming apparatus has executed image formation of another image by using another image data, controlling to stop winding up of the long sheet in the sheet delivering apparatus before the region where the another image is formed on the long sheet is wound up into the sheet delivering apparatus, and in a state in which the winding up of the long sheet is stopped, controlling to continue the sheet feeding and conveying of the long sheet such that the region where the another image is formed on the long sheet goes out from the image forming apparatus, wherein the sheet feeding and conveying of the long sheet continues until a trailing end of the region where the another image is formed goes out from the image forming apparatus, and in a state that the region where the another image is formed on the long sheet has gone out from the image forming apparatus, controlling to stop conveying of the long sheet temporarily, and in the state that conveying of the long sheet is stopped temporarily, controlling to cut out the region where the another image is formed thereby separating the long sheet.

18. The non-transitory computer-readable recording medium described in claim 17, wherein:

in the case in which the image formation of the another image has been executed by using the another image data, the program further causes the computer to perform operations of controlling to restart temporarily conveying of the long sheet which has been stopped temporarily, so as to make the long sheet into a state of going out from the image forming apparatus by a length necessary for setting a leading end of a succeeding long sheet from which the region where the another image is formed has been removed, onto the sheet delivering apparatus, and then controlling to stop again conveying of the long sheet temporarily, and to set the long sheet in the state that conveying of the long sheet is stopped temporarily.

19. The non-transitory computer-readable recording medium described in claim 18, wherein in a case where the leading end of the succeeding long sheet from which the region where the another image is formed has been removed is set onto the sheet delivering apparatus, the program causes the computer to perform control to restart sheet feeding by the sheet feeding apparatus, image formation by the image forming apparatus, and winding up by the sheet delivering apparatus.

* * * * *